United States Patent [19]

Scheler et al.

[11] Patent Number: 5,401,471
[45] Date of Patent: Mar. 28, 1995

[54] FLUIDIZED BED REACTOR COMPRISING A NOZZLE GRATE

[75] Inventors: Wolfgang Scheler, Bad Homburg; Jurgen Emmel, Biebesheim; Wladyslaw Lewandowski, Schwalbach/Ts., all of Germany

[73] Assignee: Metallgesellschaft Aktiengesellschaft, Frankfurt am Main, Germany

[21] Appl. No.: 166,436

[22] Filed: Dec. 14, 1993

[30] Foreign Application Priority Data

Jan. 20, 1993 [DE] Germany .................. 43 01 365.1

[51] Int. Cl.⁶ .............................................. F27B 15/10
[52] U.S. Cl. ............................... 422/143; 34/582; 34/585; 110/245; 239/550; 422/311
[58] Field of Search .............. 422/139, 140, 143, 311; 110/298, 245, 300; 34/359, 360, 582, 585; 122/4 D; 431/7, 170; 432/58; 239/499, 505, 506, 565, 550, 557, 600

[56] References Cited

U.S. PATENT DOCUMENTS

| | | | |
|---|---|---|---|
| 491,549 | 2/1893 | Gordon | 110/298 |
| 692,254 | 2/1902 | Dolan | 239/600 X |
| 993,369 | 5/1911 | Hensel | 239/600 X |
| 2,628,158 | 2/1953 | Wilcox et al. | |
| 2,781,088 | 2/1957 | Ayers | 239/600 X |
| 2,841,476 | 7/1958 | Dalton | 422/143 X |
| 3,918,639 | 11/1975 | Binasik | 239/600 X |
| 4,292,023 | 9/1981 | DeFeo et al. | 239/600 X |
| 4,378,744 | 4/1983 | DeFeo et al. | 239/600 X |

FOREIGN PATENT DOCUMENTS 0019422 11/1980 European Pat. Off. .
1065383 9/1959 Germany .

*Primary Examiner*—Amalia L. Santiago
*Attorney, Agent, or Firm*—Sprung Horn Kramer & Woods

[57] ABSTRACT

A fluidized bed reactor comprising a housing, and a nozzle grate disposed in the lower portion of the housing and serving to introduce a fluidizing fluid into the reactor. The nozzle grate consists of a plurality of approximately horizontally extending tubes and nozzles provided on such tubes. The tubes are detachably connected to the housing of the reactor and the housing of the reactor has at least one support for each tube, which support supports the tube as it is rotated about its longitudinal axis.

5 Claims, 1 Drawing Sheet

FLUIDIZED BED REACTOR COMPRISING A NOZZLE GRATE

BACKGROUND OF THE INVENTION

1. Field of the Invention

This invention relates to a fluidized bed reactor comprising a nozzle grate, which is disposed in the lower portion of the housing of the reactor and serves to introduce a fluidizing fluid into the reactor. It comprises a plurality of approximately horizontally extending tubes, and nozzles provided on the tubes.

2. Related Art

Fluidized bed reactors of such kind are known and have been described in German Patent 28 05 244 and the corresponding U.S. Pat. No. 4,268,359.

SUMMARY OF THE INVENTION

It is an object of the invention to provide a nozzle grate which can easily be serviced and has nozzles which can conveniently be replaced. In fluidized bed reactors, as described hereinabove that object is realized in accordance with the invention in that the tubes are detachably connected to the housing of the reactor, and the housing of the reactor is provided with at least one support for each tube. Each support supports its tube as it is rotated about its longitudinal axis.

Owing to the design of the tubes in accordance with the invention and owing to the support, during assembly and servicing operations the nozzles are accessible not only from above but also from below in a simple manner. Preferably for each tube the housing of the reactor has at least one opening which is designed as a support.

Whereas the detachable connections between the tubes and the housing of the reactor usually consist of screw-threaded joints, other detachable connections, such as clamp-type joints, may also be used. This applies as well to the detachable connection between the nozzles and the tubes.

The housing of the reactor is suitably provided on its outside adjacent to each opening with a sleeve, to which the tube that extends through the opening is detachably connected.

BRIEF DESCRIPTION OF THE DRAWING

Further features of the nozzle grate provided in the fluidized bed reactor are explained with reference to the accompanying drawing, in which.

Figure 1:
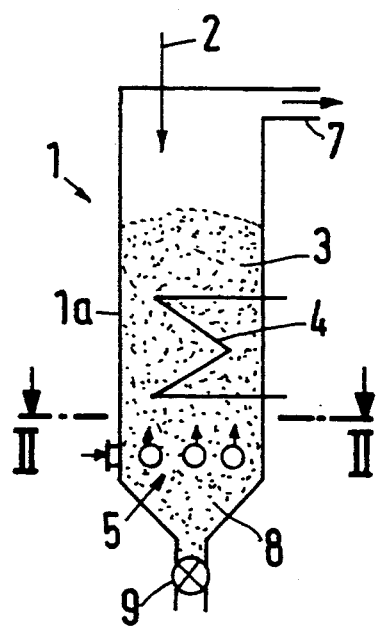
FIG. 1 is a schematic longitudinal sectional view showing the fluidized bed reactor.

The fluidized bed reactor 1 shown in FIG. 1 may serve various purposes, such as for a thermal treatment, particularly for cooling or heating granular solids, which are supplied through the line 2. The reactor contains a fluidized bed 3, which is agitated by a rising fluidizing fluid. A heating or cooling fluid flows in known manner through a system of pipes 4 to supply or dissipate heat. The housing 1a of the reactor in its lower portion is provided with a nozzle grate 5, which consists of parallel tubes 5a, 5b and 5c, which are provided with numerous nozzles 6; see particularly FIG. 2.

A fluidizing fluid, such as steam or any desired gas or gas mixture, is supplied to the nozzle grate 5 from the outside under pressure, exits through the nozzles 6 and rises through the fluidized bed 3. Gases and vapors are removed through the exhaust duct 7. Treated solids fall through the nozzle grate 5 into the collecting bin 8 provided below that grate and are withdrawn downwardly through a lock chamber device 9.

Figure 2:
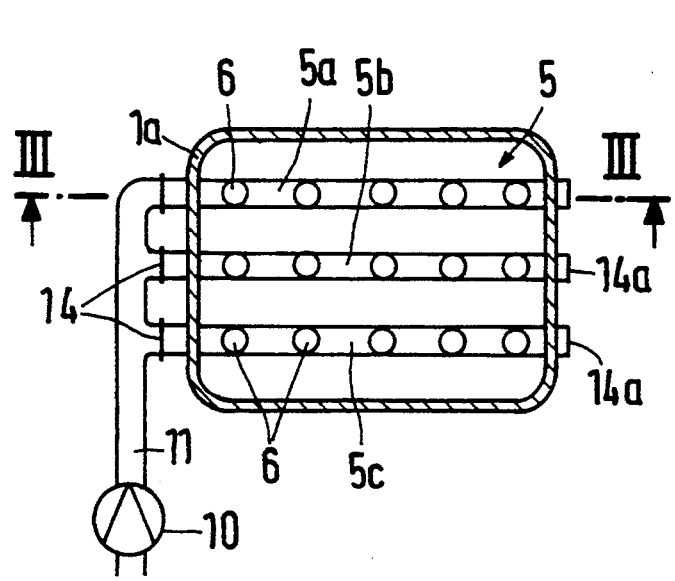
FIG. 2 is a horizontal sectional view taken on line II—II in FIG. 1.

FIG. 2 is a schematic top plan view showing the nozzle grate 5. By a compressor 10 the fluidizing fluid is sucked from the outside and is first forced into main line 11. The fluidizing fluid flows from the main line 11 into the tubes 5a, 5b and 5c and, through the nozzles 6 on said tubes, exits into the fluidized bed 3. Detachable flanged joints 14 are provided between the ends of the tubes 5a to 5c and the main line 11. The detachable connections 14 between the tubes and the housing 1a of the reactor are not shown in FIG. 2 in the interest of clarity.

Figure 3:
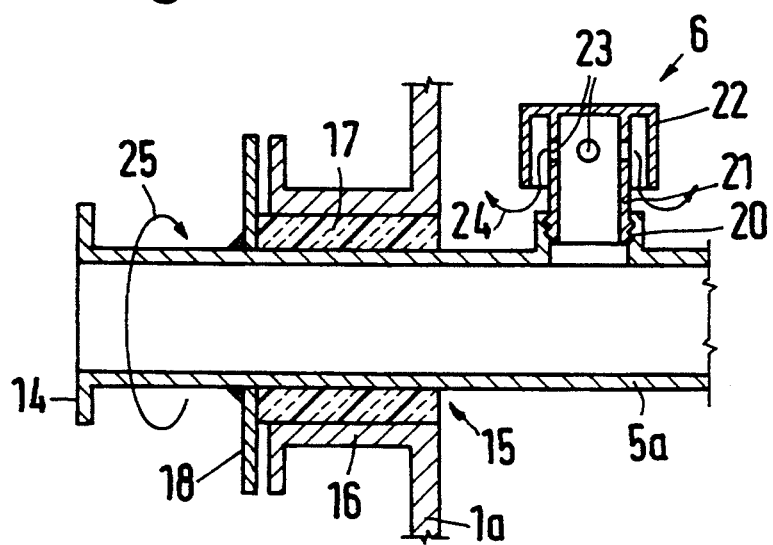
FIG. 3 is a vertical sectional view taken on line III—III in FIG. 2 and showing a portion of the housing of the reactor adjacent to an opening.

However, details of the detachable connection between a tube 5a and the housing 1a of the reactor are shown in FIG. 3. A sleeve 16 is connected to the body of the reactor adjacent opening 15 in the housing and a seal 17 is provided between the sleeve and the tube 5a. The seal may consist, e.g., of a stuffing-box. An annular disk 18, welded to the tube 5a, is detachably connected by means (not shown), e.g., by bolts and nuts, to the sleeve 16. The connection between the closed other end 14a of each tube and the housing 1a may be similar.

The detachable connections between the tubes 5 and the housing 1a can also be by other means, such as screw-threaded joints.

FIG. 3 further shows a nozzle 6, having a stem 21, which is detachably connected to the tube 5a. For that purpose the tube is provided with a tapped ring 20, into which the stem 21 of the nozzle has been screwed. The stem 21 is tubular and is closed at its top end by a cap 22. The stem has holes 23, through which the fluidizing fluid exits into the fluidized bed 3 on the path indicated by arrow 24.

PREFERRED EMBODIMENTS

For assembling and servicing operations it may be desirable for an operator to have access from below, i.e., from the collecting bin 8 (see FIG. 1), to the nozzles which have been turned down. For that purpose a rotation of the associated tube 5a is permitted in that its connection 14 to the main line 11 and the connection 17 between the annular disk 18 and the sleeve 16 are eliminated. The tube 5a can now be moved, by rotation about its longitudinal axis, as is indicated by the curved arrow 25 in FIG. 3. Such servicing is usually performed when the vessel is empty, i.e., when it does not contain a fluidized bed 3. When the tube 5a has been rotated through 180° from the position shown in FIG. 3, the nozzle 6 is downwardly directed and can easily be reached by an operator positioned below the tube 5a who can then clean or replace the nozzle. Such rotation of the tube 5a is not hindered by the seal 17.

We claim:

1. A fluidized bed reactor comprising:
   a housing, a nozzle gate disposed in the lower portion of the housing and serving to introduce a fluidizing fluid into the reactor, the nozzle grate comprising a plurality of approximately horizontally extending tubes provided with nozzles, said nozzles being removably mounted on said tubes, detachable connections between the tubes and the housing of the reactor, and at least one support between the housing of the reactor and each tube, each support supporting a tube so that the tube may be rotated about its longitudinal axis.

2. A fluidized bed reactor according to claim 1, wherein each support is associated with an opening in the housing.

3. A fluidized bed reactor according to claim 1, wherein the nozzles are detachably secured to the tubes by screw threads.

4. A fluidized bed reactor according to claim 2, wherein the housing of the reactor is provided on its outside adjacent each opening with a sleeve to which the tube that extends through the opening is detachably connected.

5. A fluidized bed reactor according to claim 4, including a seal between each tube and its sleeve.

* * * * *